March 17, 1942. B. CAMPBELL 2,276,715
PORTABLE DRIER
Filed Sept. 5, 1939
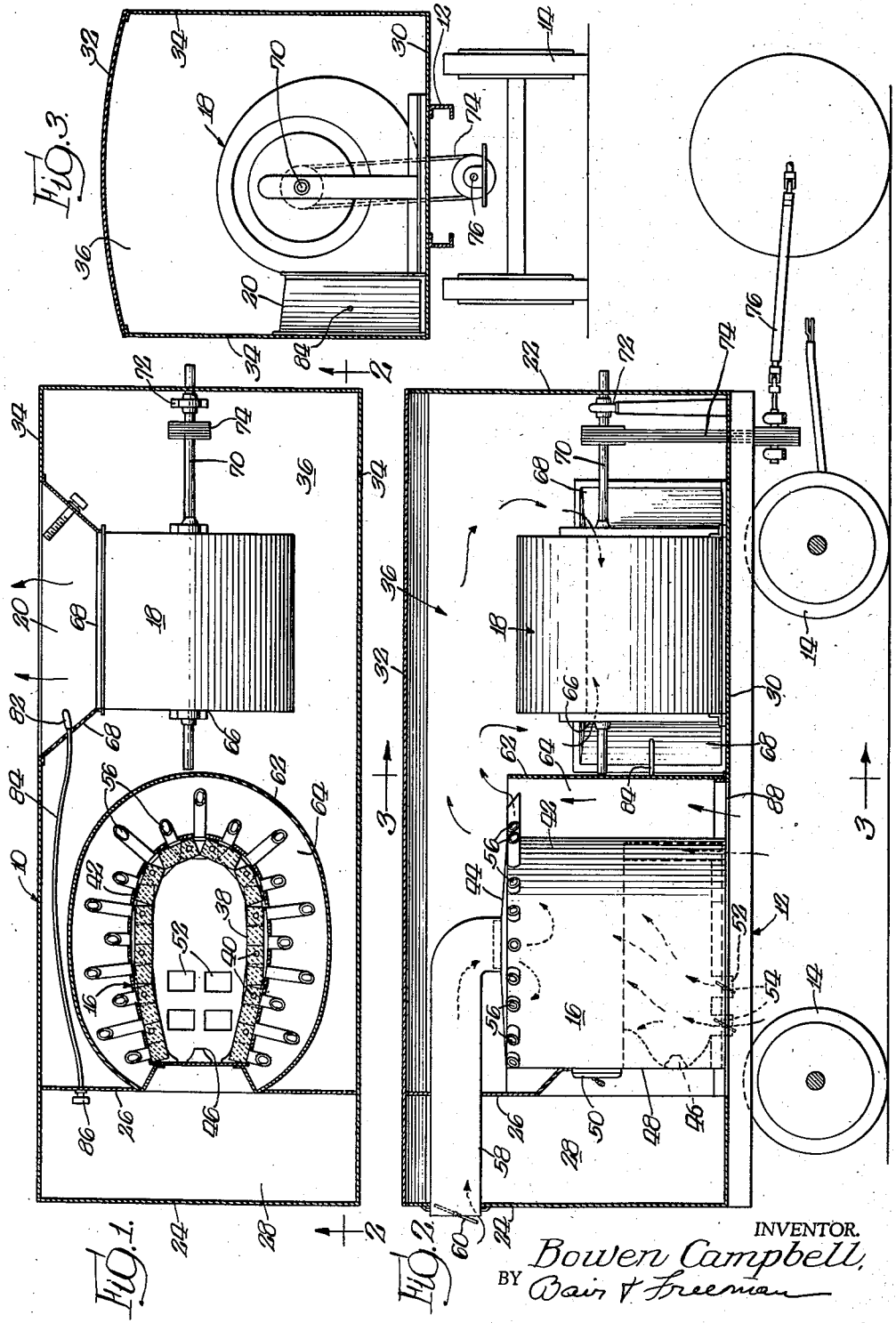
INVENTOR.
Bowen Campbell,
BY Bair & Freeman
ATTORNEYS.

Patented Mar. 17, 1942

2,276,715

UNITED STATES PATENT OFFICE 2,276,715

PORTABLE DRIER

Bowen Campbell, Des Moines, Iowa

Application September 5, 1939, Serial No. 293,414

2 Claims. (Cl. 263—19)

My invention relates to driers and particularly those of a construction which can be carried about from place to place so as to be available for use wherever needed.

Among the objects of my invention is the provision of a new and improved drier which is so designed that it is capable of mixing the products of combustion with additional air in a large space so that a complete co-mingling takes place in order that a correspondingly large volume of moderately warm dry air can be supplied from the device.

Another object is the provision of a new and improved drier of such a construction that it can be mounted upon some means for transporting it from place to place, the drier being built with a combustion chamber and a blower, both housed within an enclosure so that products of combustion emerging from the chamber can be mixed with air drawn into the enclosure causing the interior together with the bodies of the combustion chamber and the fan to be maintained at an elevated temperature in order to more easily control the moderately high temperature of a large volume of mixed gases and air to be supplied for drying purposes.

Still another object is the provision of a new and improved portable drier including a large mixing enclosure designed to collect the combustion gases after they have been mixed and diluted by successive quantities of air introduced at various points as the combustion gases pass from the combustion chamber into the large enclosure, there being provided a fan for drawing the mixture from the enclosure which is shielded from the combustion chamber by baffle means preventing initially heated gases from being drawn directly into the blower inlet.

A further object is the provision of a new and improved heating device designed to heat and mix combustion gases with additional quantities of fresh air so designed that in the walls of the combustion chamber are positioned air passages from the atmosphere to a suitable mixing enclosure performing the double function of cooling the walls of the combustion chamber and at the same time admitting fresh air to be mixed with the combustion gases, there being also provision where occasion requires of a baffle surrounding the combustion chamber to provide passage for supplemental quantities of outside air heated preliminarily by the outer walls of the combustion chamber before being mixed with the gases emerging directly from the chamber.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a top sectional view of an embodiment of the portable drier.

Figure 2 is a longitudinal elevation of the drier partly in section taken on the line 2—2 of Figure 1.

Figure 3 is a cross sectional view of the drier taken on the line 3—3 of Figure 2.

Although the mere mixing of the products of combustion with air for the purpose of obtaining a tempered gaseous discharge for heating purposes may not be broadly novel, nevertheless, the application of this principle to the effect that relatively large volumes of very moderately heated air and combustion gases are provided in the manner shown by the application has not heretofore been practiced.

In the operation of the compact portable device shown there is provided a large box or compartment 10 supported by a frame 12 upon wheels 14 for transporting it from place to place. Within the box 10 there is positioned a combustion chamber 16 and a blower 18. The combustion chamber when heated by some conventional means raises the temperature of the air and objects within the box 10. The blower 18 has its inlet opening within the space in the box 10 and draws the heated air from that space passing it outward from the blower wherever it may be needed.

In the operation of the combustion chamber air for combustion is drawn in through the bottom while additional air is drawn in at the top and mixed with the combustion gases before they are expelled outward into the space within the box 10. Within this space more air is added to the already constituted mixture before it is passed to the blower inlet and expelled by the blower.

Specifically, the box 10 includes a front end 22, a rear end 24, and an intermediate partition 26 adjacent the rear end forming a space 28 immediately behind the combustion chamber 16. The box is additionally provided with a bottom 30, a top 32, and sides 34. These sides, top and bottom form an enclosure 36 within the box, which serves as a space of large volume for permitting the mixture of combustion gases with additional air before they are fed to the blower 18.

The combustion chamber itself is formed by walls 38 as shown in Figure 1, comprising heat resisting blocks making up the side walls of the chamber. A plurality of vertical air passages 40 pass through the walls communicating with the atmosphere at the lower end and with the enclosure 36 at the upper end. Outside the wall there is provided a sheet metal casing 42 closed at the upper end by a top 44. A burner 46 is positioned within the combustion chamber located at the rear side 48 thereof. In the rear side there is provided a fire door 50 giving access to the interior of the combustion chamber.

At the bottom of the chamber there is a plurality of combustion air inlet openings 52 which, as shown in Figure 2, are designed to be adjusted as to the amount of opening by adjustable dampers 54, thereby permitting any desired quantity of air to be admitted to the combustion chamber.

Near the top of the chamber there is provided a plurality of outlet vents 56 which permit the combustion gases from the interior of the combustion chamber to be expelled substantially radially outwards in all directions at the top of the combustion chamber. When the gases are thus expelled from the chamber they are diffused throughout the enclosure 36.

Also directed into the combustion chamber is a pipe or conduit 58 which connects centerably with the top 44 of the combustion chamber and is bent at right angles so as to extend through the partition wall 26 and outwardly through the rear wall 24. An adjustable damper 60 is provided at the rear to control the flow of air through the conduit.

A baffle 62 roughly conforming to the shape of the combustion chamber substantially encircles the chamber at a distance therefrom forming an air passage 64 from the bottom 30 of the enclosure 36 to a plane above the middle and adjacent the discharging vents 56. The baffle as shown in the drawing is high enough so that it extends in fact above the vents so as to deflect combustion gases emerging therefrom and spread them out into the top portion of the enclosure.

It will be noted additionally that the vents 56 are of different lengths, as best seen in Figure 1, so that in addition to being directed in various radial directions the hot air emerging therefrom is blown at a greater or less distance from the combustion chamber depending upon the lengths of the vent pipes.

Located also within the enclosure 36 is the blower 18 here shown as a centrifugal type fan. The eye or inlet of the fan is at 66 and the outlet at 20, the relationship of which is best seen in Figure 1. The inlet 66 is fed directly by the gas and air in the enclosure 36. The outlet 20 is formed by a funnel shaped piece 68 designed to spread the gas delivered therefrom into a relatively large area. The fan member of the blower, not shown, is mounted axially upon a shaft 70 which extends forwardly within the box 10 to a forward bearing post 72. The blower in the design shown is adapted to be driven through a belt 74 and flexible shaft 76 connected to the attaching tractor shown in full lines in Figures 1 and 2.

A thermometer bulb 82 is shown at the outlet of the blower 18 connected by a suitable line 84 to a thermometer gauge 86 located at the rear partition 26 at a point adjacent the firebox so that control of the heat in the combustion chamber may be properly adjusted as atmospheric conditions change in order to control the temperature of the gaseous mixture supplied.

In operation, a fire is made in the combustion chamber which sets up a draft in the chamber fed by combustion air entering the combustion air inlet openings 52, the size of which can be adjusted by manipulating the dampers 54. The gaseous combustion vapors comprising products of combustion thus formed are mixed with incoming air at the top of the combustion chamber where the quantity of fresh air can likewise be controlled by manipulation of an adjustable damper 60. By introducing fresh air into the top of the combustion chamber the temperature of the gaseous vapors is modified somewhat before they are drawn out radially in all directions through the vents 56.

After the fire in the combustion chamber has been kindled, the blower 18 can be started, which immediately sets up or tends to set up a forced draft through all the air passage inlets. After the forced draft has been started more air is likewise drawn upward between the baffle 62 and the combustion chamber casing 42 through the inlet hole 88 at the bottom. Air coming through 88 warms a slight amount by coming into contact with the combustion chamber casing and as it ascends becomes mixed with the mixed products of combustion and air emerging from the vents 56. The baffle 62 forming as it does a supplemental air inlet passage also serves as a deflecting fence for urging the hot vapors coming out of the vents upwards in order that they may be mixed with the large volume of air within the enclosure 36. While the air and combustion gases are thus being mixed the ultimately mixed product is drawn inward at the inlet 66 of the blower and then forced outward at the outlet 20.

There are no cool parts of the apparatus to chill the air coming into contact with them. This serves to maintain a volume of air and gas at a substantially uniform temperature before it is passed outward from the enclosure to the blower outlet.

It will thus become apparent that there has been provided a new and improved portable drying apparatus which is so designed that it can mix relatively large successive quantities of air with a correspondingly small amount of combustion gas in order to raise the temperature of a sizable volume of mixed air and gas to a moderately high degree for use in drying operations. The number of drier parts are kept to a minimum and so positioned that the heating apparatus and the blower are immediately adjacent to each other so that only a minimum of space may be required. Baffles and air streams are additionally supplied in order to keep the walls of the combustion chamber from becoming overheated, which might otherwise concentrate the heat supplied too greatly in one portion only of the enclosure.

It is desirable to keep the large volume of air within the enclosure at a uniformly moderate heat so that when it is supplied for drying purposes there may be no scorching of the products to be dried in some instances, or deficiency in others.

The drier is furthermore of a flexible character permitting it to not only be hauled from place to place but permitting it likewise to be driven by alternative sources of power, such as the drive connection of a tractor or independently by an electric motor.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A portable drier for mixing successive quantities of air with products of combustion and expelling the mixture comprising a portable frame, an enclosure on said frame, a combustion chamber within said enclosure, a variable combustion air inlet at the bottom, wheels on said frame spacing the bottom of said chamber above a supporting surface, a fuel burner at the bottom of the combustion chamber, a variable auxiliary air inlet and a plurality of events extending horizontally outwardly in various directions at the top of said chamber for distributing a mixture of products of combustion and air from the chamber into said enclosure, a baffle positioned around said chamber with a portion thereof adjacent the vents in the path of a warm mixture emerging from the vents and forming together with the exterior wall of said chamber a supplemental air passage into the enclosure, said passage having an inlet at one end thereof communicating with the atmosphere at a location adjacent the bottom of said combustion chamber, and a blower on said frame having an inlet within the enclosure and adapted to receive its mixture at the inlet, blow it outwardly from the enclosure and constantly tend to maintain a draft through the combustion chamber and the passages connected with said enclosure.

2. A portable drier for heating, mixing and distributing a mixture of air and combustion gases comprising a portable enclosure of elongated form having an air inlet thereto, a blower secured to the enclosure adjacent one end thereof for expelling the contents of said enclosure, and a vertical combustion chamber being also secured to the enclosure adjacent the other end and separated from said blower, said chamber being provided with a fuel burner, an adjustable combustion air inlet at the base of said chamber, a fire door at the side communicating with an air space outside said enclosure and a plurality of elongated vent pipes extending horizontally outwardly in various directions at the top for distributing the heated combustion gases into the enclosure, and a baffle in the enclosure interposed in the space between the blower inlet and the combustion chamber and vents thereon to deflect the mixture of air and combustion gas away from immediate entrance into the blower inlet.

BOWEN CAMPBELL.